United States Patent
Han

(10) Patent No.: US 10,037,307 B2
(45) Date of Patent: Jul. 31, 2018

(54) DEVICE FOR AVERAGE CALCULATING OF NON-LINEAR DATA

(71) Applicant: Seokjin Han, Cupertino, CA (US)

(72) Inventor: Seokjin Han, Cupertino, CA (US)

( * ) Notice: Subject to any disclaimer, the term of this patent is extended or adjusted under 35 U.S.C. 154(b) by 0 days.

(21) Appl. No.: 15/561,628

(22) PCT Filed: Feb. 26, 2016

(86) PCT No.: PCT/KR2016/001947
§ 371 (c)(1),
(2) Date: Sep. 26, 2017

(87) PCT Pub. No.: WO2016/159518
PCT Pub. Date: Oct. 6, 2016

(65) Prior Publication Data
US 2018/0074997 A1    Mar. 15, 2018

(30) Foreign Application Priority Data
Apr. 2, 2015    (KR) .................. 10-2015-0047010

(51) Int. Cl.
*G06F 7/38*     (2006.01)
*G06F 17/18*    (2006.01)
(Continued)

(52) U.S. Cl.
CPC .............. *G06F 17/18* (2013.01); *G06F 7/02* (2013.01); *G06F 7/24* (2013.01); *G06F 7/483* (2013.01); *G06F 7/544* (2013.01)

(58) Field of Classification Search
CPC ... G06F 7/02; G06F 7/24; G06F 7/483; G06F 7/544
(Continued)

(56) References Cited

U.S. PATENT DOCUMENTS 5,631,550 A * 5/1997 Castro .................. H02M 1/4216
323/205

FOREIGN PATENT DOCUMENTS

EP         0637813 A2 *  2/1995  ............. G06T 15/04
KR    10-2005-0019883 A    3/2005
(Continued)

OTHER PUBLICATIONS

Search Report, dated Jun. 13, 2016, for International Application No. PCT/KR2016/001947.
(Continued)

*Primary Examiner* — Tan V. Mai
(74) *Attorney, Agent, or Firm* — LRK Patent Law Firm

(57) ABSTRACT

A device for calculating an average of nonlinear data includes: an input module for receiving a nonlinear function F and nonlinear data $y_1$ and $y_2$; a comparison module for deriving nonlinear data $c_1$ and $c_2$ sorted in a descending order, by comparing the nonlinear data $y_1$ and $y_2$; an index module for deriving an index value $d_1$ according to a preset computation, from the sorted nonlinear data $c_1$ and $c_2$; a lookup table (LUT) memory for pre-storing an LUT of the index value d1 and a variable B by using a preset computation formula, and deriving the variable B corresponding to the index value $d_1$ if the index value $d_1$ is received; and a computation module for receiving $c_1$ of the sorted nonlinear data and the variable B and deriving a final nonlinear output value A through the preset computation.

20 Claims, 13 Drawing Sheets

(51) Int. Cl.
*G06F 7/02* (2006.01)
*G06F 7/24* (2006.01)
*G06F 7/483* (2006.01)
*G06F 7/544* (2006.01)

(58) Field of Classification Search
USPC .................................................. 708/131, 445
See application file for complete search history.

(56) References Cited

FOREIGN PATENT DOCUMENTS

| | | |
|---|---|---|
| KR | 10-2006-0081205 A | 7/2006 |
| KR | 10-2010-0022087 A | 2/2010 |
| KR | 10-2010-0079546 A | 7/2010 |
| KR | 10-2011-0105319 A | 9/2011 |

OTHER PUBLICATIONS

Written Opinion, dated Jun. 13, 2016, for International Application No. PCT/KR2016/001947.

* cited by examiner

DEVICE FOR AVERAGE CALCULATING OF NON-LINEAR DATA

CROSS-REFERENCE TO RELATED APPLICATIONS

The present application is a U.S. National Phase entry from International Application No. PCT/KR2016/001947, filed Feb. 26, 2016, which claims priority to Korean Patent Application No. 10-2015-0047010, filed Apr. 2, 2015, the disclosure of which is incorporated by reference herein in its entirety.

BACKGROUND OF THE INVENTION

1. Field of the Invention

The present invention relates to an average calculation device for calculating an average of nonlinear data, the device comprising: an input module for receiving a nonlinear function and nonlinear data; a comparison module for deriving nonlinear data sorted in a descending order by comparing the nonlinear data; an index module for deriving an index value from the sorted nonlinear data according to a preset computation; a lookup table memory for storing a lookup table (LUT) of the index value and a variable in advance using a preset computation formula, and deriving a variable corresponding to an index value if the index value is received; and a computation module for receiving the largest value among the sorted nonlinear data and the variable and deriving a final nonlinear output value through a preset computation.

2. Description of Related Art

Since a relation between input and output of a system, in which an output of an input x is y, is expressed in the form of a function y=ax+b and its graph is configured in the form of a straight line in the case of a linear system, an output value according to an input value can be easily predicted. However, unlike the linear system, since a nonlinear system is expressed in the form of an exponential function y=ax^b or a logarithmic function y=log X and its graph is configured in the form of a curve, an output value according to an input value is not easy to predict through a simple calculation. Particularly, although a small cause may output a small effect and a big cause may output a big effect in the linear system, a small cause may output a large effect and a large cause may output a small effect in the nonlinear system, and thus interest in the method of effectively processing input and output data of a nonlinear system is increasing.

However, when a nonlinear system is processed using a hardware device, a nonlinear data is calculated after being converted into a linear data and the calculated value is converted again into a nonlinear data to be outputted as shown in FIG. 1, and thus there is a problem that the capacity of memory needed for nonlinear-to-linear conversion and linear-to-nonlinear conversion unnecessarily increases. For example, as shown in FIGS. 2 and 3, an average calculation device of a conventional nonlinear system includes three lookup table memories and requires an overall memory size of about 40,000 bits.

Accordingly, chip prices increase as the memory size grows to a large scale, and since the memory size is large, the memory size of a system also increases use several lookup table values, and thus flexibility is lowered, and an error cannot be completely removed although a large number of gradations (e.g., 12 bits), larger than the number of input gradations (e.g., 8 bits), are used to reduce the calculation error.

SUMMARY OF THE INVENTION

Therefore, the present invention has been made in view of the above problems, and it is an object of the present invention to provide an average calculation device using minimum memory from the viewpoint of hardware to reduce the memory size of the lookup tables used in the prior art in calculating an average of nonlinear data (particularly, of an exponential function or a logarithmic function).

Another object of the present invention is to provide an average calculation device for deriving nonlinear data sorted in a descending order by comparing nonlinear data through a comparison module, reducing the size of a lookup table memory by deriving an index value through an index module, and deriving a final nonlinear output value by calculating a variable using a preset computation formula through the lookup table memory, in which all the hardware operations are performed in a nonlinear domain and do not convert the nonlinear data into a linear domain unlike a conventional technique.

Another object of the present invention is to provide an average calculation device which is easy to respond to a change of a function by reducing the table size, needs a memory size as small as 5% of a conventional memory size, is capable of reducing the overall chip size to be less than 50%, and is capable of performing a calculation precisely compared with a conventional technique by minimizing the error.

To accomplish the above objects, according to an embodiment of the present invention, there is provided an average calculation device for calculating an average of nonlinear data, the device comprising: an input module for receiving a nonlinear function F and nonlinear data y1 and y2; a comparison module for deriving nonlinear data c1 and c2 sorted in a descending order by comparing the received nonlinear data y1 and y2; an index module for deriving an index value d1 from the sorted nonlinear data c1 and c2 according to a preset computation; a lookup table memory for storing a lookup table (LUT) of the index value d1 and a variable B in advance using a preset computation formula, and deriving a variable B corresponding to an index value if the index value d1 is received; and a computation module for receiving c1 among the sorted nonlinear data and the variable B and deriving a final nonlinear output value A through a preset computation.

In addition, in the average calculation device for calculating an average of nonlinear data according to an embodiment of the present invention, the nonlinear function F is an exponential function or a logarithmic function.

At this point, in the average calculation device for calculating an average of nonlinear data according to an embodiment of the present invention, the index module derives the index value d1 through a computation of d1=c2/c1 when the nonlinear function F is an exponential function and derives the index value d1 through a computation of d1=c1−c2 when the nonlinear function F is a logarithmic function, and the index module derives the final nonlinear output value A through a computation of A=B*c1 when the nonlinear function F is an exponential function and derives the final nonlinear output value A through a computation of A=B+c1 when the nonlinear function F is a logarithmic function.

In addition, in the average calculation device for calculating an average of nonlinear data according to an embodiment of the present invention, the lookup table memory stores a lookup table of the index value d1 and the variable B in advance using a preset computation formula of $$B = F\left(\frac{1}{2} + \frac{1}{2}F^{-1}(d_1)\right).$$

In addition, the average calculation device for calculating an average of nonlinear data according to an embodiment of the present invention may further comprise a weighting value application module for deriving weighting-value-applied nonlinear data m1 and m2 by applying weighting values w1 and w2 to the nonlinear data y1 and y2, respectively, and the input module further receives the weighting values w1 and w2.

At this point, in the average calculation device for calculating an average of nonlinear data according to an embodiment of the present invention, the comparison module derives the nonlinear data c1 and c2 sorted in a descending order by comparing the weighting-value-applied nonlinear data m1 and m2 with each other, and the weighting-value-applied nonlinear data m1 and m2 are derived using a formula of $$m_1 = F\left(\frac{w_1}{w_1 + w_2}\right) * y_1 \text{ and } m_2 = F\left(\frac{w_2}{w_1 + w_2}\right) * y_2,$$

and the lookup table memory stores a lookup table of the index value d1 and the variable B in advance using a preset computation formula of $B=F(1+F^{-1}(d_1))$.

At this point, in the average calculation device for calculating an average of nonlinear data according to an embodiment of the present invention, the weighting value application module includes a first multiplier and a second multiplier.

In addition, the average calculation device for calculating an average of nonlinear data according to an embodiment of the present invention may further comprise a tuning lookup table memory connected between the comparison module and the computation module to match an input function parameter and an output function parameter by correcting c1, which is the largest value among the sorted nonlinear data, through a preset computation.

In addition, the average calculation device for calculating an average of nonlinear data according to an embodiment of the present invention may further comprise a bypass MUX for outputting a bx value calculated by the comparison module as a final nonlinear output value if a preset condition is satisfied, and when the preset condition is satisfied, supply of power to the index module, the lookup table memory and the computation module is interrupted.

At this point, the average calculation device for calculating an average of nonlinear data according to an embodiment of the present invention further comprises an auxiliary lookup table memory for storing an auxiliary lookup table in advance for the final nonlinear output value bx using a preset computation formula, and transmitting a bx corresponding to the auxiliary lookup table to the bypass MUX if the sorted data c1 and c2 exist within a preset range.

According to another aspect of the present invention, there is provided an average calculation devices for calculating an average of a plurality of non-linear data, the device comprising: an input module for receiving a nonlinear function F and nonlinear data y1, y2 y. . . n; a comparison module for deriving nonlinear data c1, c2 . . . cn sorted in a descending order by comparing the nonlinear data y1, y2 . . . yn with each other; and first to n-th computation modules for deriving a nonlinear output value An from the sorted nonlinear data c1, c2 . . . cn according to a preset computation (n is an integer equal to or larger than 2), wherein the first to n-th computation modules are cascaded to derive the final nonlinear output value An.

At this point, in the average calculation device for calculating an average of nonlinear data according to an embodiment of the present invention, when a k-th computation module (1<k<n) among the first to n-th computation modules derives a nonlinear output value Ak, the k-th computation module receives a nonlinear output value Ak−1 derived by a k−1-th computation module and derives the nonlinear output value Ak from a nonlinear data ck+1 and the nonlinear output value Ak−1 according to a preset computation.

In addition, in the average calculation device for calculating an average of nonlinear data according to an embodiment of the present invention, each of the first to n-th computation modules includes: an index module for deriving an index value from an inputted nonlinear data through a preset computation according to a function; a lookup table memory for storing a lookup table (LUT) of the index value and a variable in advance using a preset computation formula, and deriving a variable corresponding to an index value if the index value is received; and a computation module for receiving a largest value among the sorted nonlinear data and the variable and deriving a final nonlinear output value through a preset computation.

In addition, the average calculation device for calculating an average of nonlinear data according to an embodiment of the present invention may further comprise a weighting value application module for deriving weighting-value-applied nonlinear data m1, m2 . . . mn by applying weighting values w1, w2 . . . wn to the nonlinear data y1, y2 . . . yn, respectively, and the input module further receives the weighting values w1, w2 . . . wn. In addition, the comparison module derives the nonlinear data c1, c2 . . . cn sorted in a descending order by comparing the weighting-value-applied nonlinear data m1, m2 . . . mn with each other.

According to another aspect of the present invention, there is provided an RGBG PenTile driving device comprising: a first average calculation device for receiving nonlinear data R1 and R2, deriving an index value through a preset computation after sorting the nonlinear data, calculating a variable according to a preset computation formula and a lookup table, and deriving a final nonlinear output value Ra through a preset computation; a second average calculation device for receiving nonlinear data B1 and B2, deriving an index value through a preset computation after sorting the nonlinear data, calculating a variable according to a preset computation formula and a lookup table, and deriving a final nonlinear output value Ba through a preset computation; and a display for receiving nonlinear data G1 and G2 and displaying the Ra, the G1, the Ba and the G2.

According to another aspect of the present invention, there is provided an HDR tone-mapping calculation device comprising: an input unit for receiving an image; a brightness determination unit for determining brightness of the input image; a plurality of lookup table memories for storing a lookup table (LUT) of an index value and a variable in advance using a preset computation formula, and deriving a variable corresponding to an index value if the index value is received; and a MUX for receiving the brightness of the inputted image from the brightness determination unit and selecting and outputting a calculation result corresponding to the brightness of the image from the plurality of lookup table memories.

Advantageous Effects

Since the average calculation device for calculating an average of nonlinear data according to the present invention may perform an average calculation of a nonlinear system with only 5% of the memory size of a conventional device by using a memory size of only about 2,000 bits rather than a conventional large memory size of 40,000 bits, flexibility of the system for storing several table values and resetting the table values according to a situation is increased.

In addition, since the average calculation device for calculating an average of nonlinear data according to the present invention configures hardware to calculate precise and complicated calculation parts using a computer and store the values resulting from the calculation and does not further increase the number of gates as much as a reduced memory size compared with a conventional calculation device, the overall hardware cost can be reduced to be less than 50%.

On the other hand, the average calculation device for calculating an average of nonlinear data according to the present invention may perform a weighted average calculation applying a weighting value, as well as a calculation of a simple arithmetic mean, perform an accurate calculation by further including a tuning LUT memory for correcting a difference between an input function parameter and an output function parameter when the parameters are different from each other, and perform a function of interrupting supply of power and outputting only sorted values when a predetermined condition is satisfied.

In addition, the average calculation device for calculating an average of nonlinear data according to the present invention may process a plurality of nonlinear data by connecting a plurality of subordinating average calculation devices and may also be effectively used in an RGBG PenTile driving device, an HDR tone-mapping calculation device and the like by using the calculation device of the present invention.

DETAILED DESCRIPTION OF THE INVENTION

Figure 1:
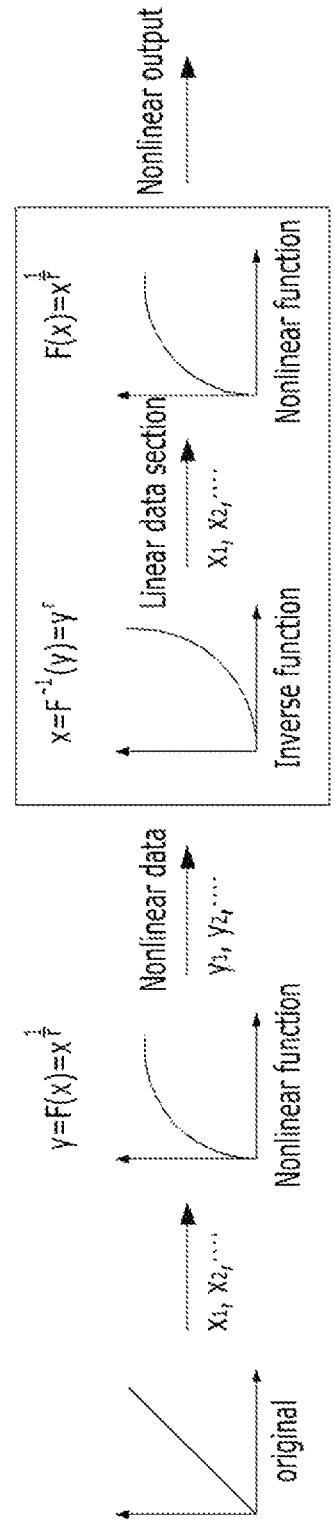
FIG. 1 is an exemplary view showing a conventional process of converting linear/nonlinear data.

Hereinafter, 'an average calculation device for calculating an average of nonlinear data' according to the present invention will be described in detail with reference to the accompanying drawings. The disclosed embodiments are provided to enable those skilled in the art to easily understand the scope of the present invention, and the present invention is not limited by such embodiments. Moreover, matters illustrated in the drawings are schematized in order to describe or explain the embodiments of the present invention more easily, and hence, may be different from forms embodied actually.

Meanwhile, the components expressed below are merely examples for implementing the present invention. Accordingly, other components may be used in other implementations of the present invention without departing from the spirit and scope of the present invention.

In addition, the expression of 'including' an element is an expression of an 'open type' which merely refers to existence of a corresponding component, and it should not be construed as precluding additional components.

In addition, the terms such as "first", "second", etc. are only used to distinguish a plurality of components from each other and do not limit the sequence among the components or other features.

Figure 2:
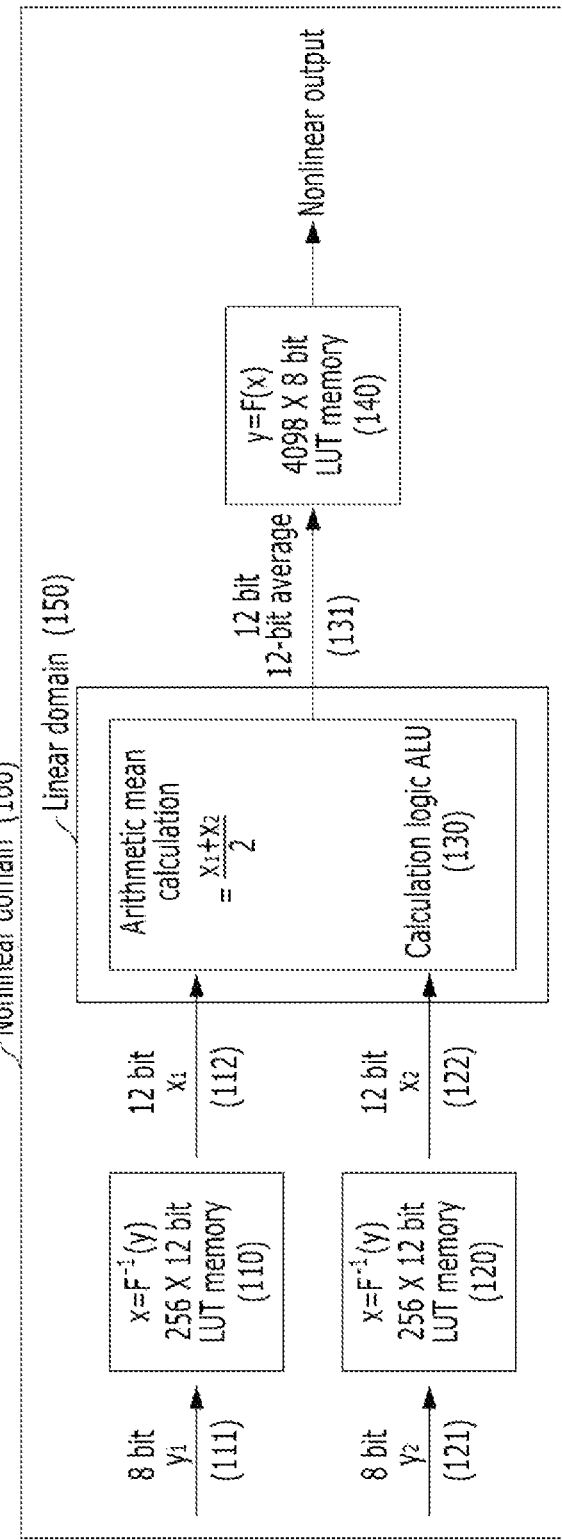
FIG. 2 is an exemplary view showing the configuration of a hardware device for calculating an arithmetic means in a conventional nonlinear system.
Figure 3:
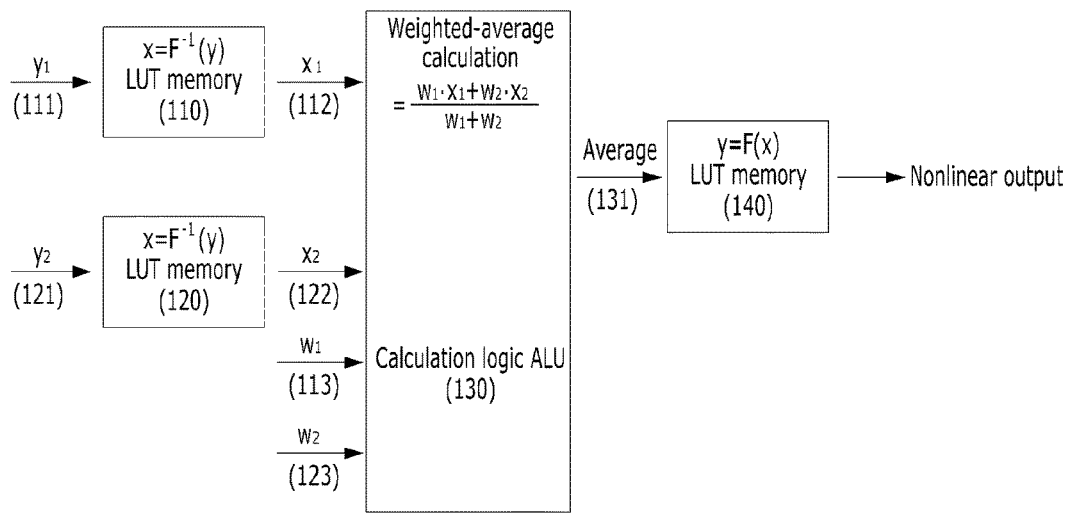
FIG. 3 is an exemplary view showing the configuration of a hardware device for calculating a weighted average in a conventional nonlinear system.

FIG. 2 is an exemplary view showing the configuration of a hardware device for calculating an arithmetic means in a conventional nonlinear system, and FIG. 3 is an exemplary view showing the configuration of a hardware device for calculating a weighted average in a conventional nonlinear system.

Referring to FIGS. 2 and 3, when an arithmetic means and a weighted average of nonlinear data are calculated, the configuration of hardware for calculating an arithmetic mean of a conventional nonlinear system includes lookup table memories 110, 120 and 140 having inverse function values of inputted nonlinear data y1 and y2, and the arithmetic means and the weighted average are calculated by changing the nonlinear domain 160 to the linear domain 150 between the lookup table memories 110, 120 and 140.

At this point, a lookup table refers to a set of results calculated in advance by a given computation and is used as a reference for acquiring a result of a given function faster than directly calculating the result when a nonlinear system of a computer calculates. In the case of a system which acquires and processes data, a lookup table is used since it is highly required to acquire a computation result within a predetermined time, and since a runtime calculation can be replaced with a simple array indexing process, it is possible to save processing time and reduce the size of memory to be used.

In addition, a conventional nonlinear calculation device converts nonlinear data into linear data, calculates an average value of converted linear signals x1 and x2 through a calculation logic Arithmetic and logic unit (ALU), calculates an arithmetic mean or a weighted average through a preset formula, and derives a nonlinear output through the lookup table memory. The calculation logic ALU calculates an arithmetic mean value through a formula of (x1+x2)/2 in the case of an arithmetic mean, and further receives weighting values w1 and w2 and calculates a weighted average value through a formula of (w1*x1+w2*x2)/(w1+w2) in the case of a weighted average.

At this point, since the conventional nonlinear calculation device consumes 256*12 bits for each of the lookup table memories 110 and 120 for nonlinear-to-linear conversion and 4098*8 bits for the lookup table memory 140 for linear-to-nonlinear conversion as shown in FIG. 2, a total memory size of 38,912 bits is needed.

For example, in the case of sRGB gamma used by most of digital images in the image signal processing, an inverse function for converting a nonlinear signal into a linear signal, i.e., the inverse function $x=F^{-1}(y)$ applied to the lookup table memories 110 and 120 of FIG. 2, has a characteristic as shown in formula 1, and an inverse function for converting a linear signal into a nonlinear signal, i.e., the inverse function $y=F(x)$ applied to the lookup table memory 140 of FIG. 2, has a characteristic as shown in formula 2.

$$C_{linear} = \begin{cases} \dfrac{C_{srgb}}{12.92}, & C_{srgb} \le 0.04045 \\ \left(\dfrac{C_{srgb}+a}{1+a}\right)^{2.4}, & C_{srgb} > 0.04045 \end{cases} \quad \text{(Formula 1)}$$

$$C_{srgb} = \begin{cases} 12.92 C_{linear}, & C_{linear} \le 0.0031308 \\ (1-a)C_{linear}^{1/2.4}-a, & C_{linear} > 0.0031308 \end{cases} \quad \text{(Formula 2)}$$

$$a = 0.055$$

In this case, an 8-bit nonlinear input (0 to 255) is normalized in a range of 0 to 1, and a value of an sRGB inverse function is calculated, and if linearized values are calculated using lookup tables of 8-bit, 10-bit, 11-bit and 12-bit, Signal-to-Noise Ratio (SNR) values can be derived. The SNR calculation formula is as shown below.

$$SNR = 20 \log\left(\frac{input}{input - output}\right)$$

Referring to table 1, observing the SNR values according to the number of bits, lookup tables having internal bits of 8-bit, 10-bit and 11-bit generate many errors, and since the errors are minimized when a lookup table of at least 12 bits is used, the conventional method only have to use a 12-bit lookup table for internal computation of the hardware configuration. (It means that the larger the SNR value is, the more an input matches, and it also means that an infinite value is the best, and the smaller the value is, the more the errors are.)

TABLE 1

Signal-to-Noise Ratio calculation table;

| Nonlinear input (8 bit) | SNR (8 bits) | SNR (10 bits) | SNR (11 bits) | SNR (12 bits) |
|---|---|---|---|---|
| 0 | ∞ | ∞ | ∞ | ∞ |
| 1 | 0 | 0 | 0 | ∞ |
| 2 | 0 | 6.0206 | ∞ | ∞ |
| 3 | 0 | ∞ | ∞ | ∞ |
| 4 | 0 | 12.0412 | 12.0412 | ∞ |
| 5 | 0 | 13.9794 | ∞ | ∞ |
| 6 | 0 | ∞ | ∞ | ∞ |
| 7 | 1.33894 | 16.902 | 16.902 | ∞ |
| 8 | 4.0824 | 12.0412 | ∞ | ∞ |
| 9 | 7.04365 | 19.0849 | 19.0849 | ∞ |
| . . . | | | | |
| 253 | ∞ | ∞ | ∞ | ∞ |
| 254 | ∞ | ∞ | ∞ | ∞ |
| 255 | ∞ | ∞ | ∞ | ∞ |

Accordingly, to improve the problem of a large-scale memory size of the conventional technique, the memory size of the lookup table used in the prior art is reduced in calculating an average of nonlinear data (particularly, of an exponential function or a logarithmic function), and an average calculation device can be configured through a plurality of modules by using minimum memory from the viewpoint of hardware, and this will be described below in detail.

Figure 4:
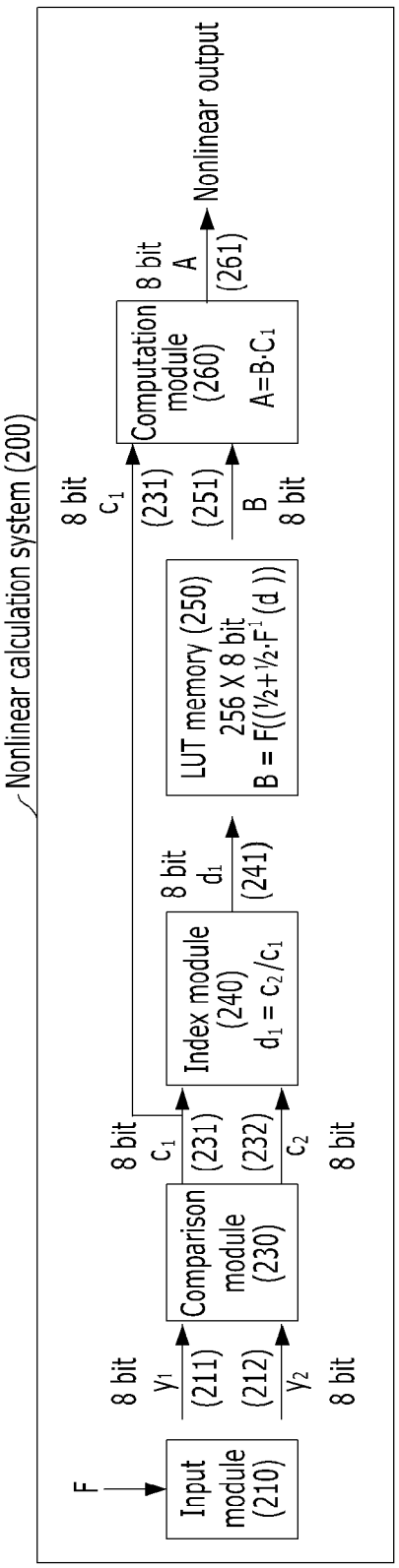
FIG. 4 is an exemplary view showing the configuration of performing an arithmetic mean calculation by an average calculation device for calculating an average of nonlinear data according to an embodiment of the present invention.

FIG. 4 is an exemplary view showing the configuration of performing an arithmetic mean calculation by an average calculation device for calculating an average of nonlinear data according to an embodiment of the present invention.

Referring to FIG. 4, an average calculation device 200 for calculating an average of nonlinear data according to the present invention may include an input module 210, a comparison module 230, an index module 240, a lookup table memory 250 and a computation module 260. At this point, an arithmetic mean is a value obtained by dividing a total sum of n variables by the number of variables n, and this is the same as a weighted average calculated using a weighting value of 0.5 as described below.

The input module 210 receives a nonlinear function F and nonlinear data y1 211 and y2 212. The nonlinear function F may be an exponential function or a logarithmic function, and hereinafter, it will be described using an exponential function as an example of the nonlinear function. At this point, the nonlinear data y1 and y2, nonlinear data c1 and c2 sorted in a descending order, an index value d1, a variable B and a final nonlinear output value A, which are a plurality of data used in the average calculation device for calculating an average of nonlinear data according to the present invention, are preferably formed in a size of 8 bits considering the hardware size and the memory size.

The comparison module 230 derives the nonlinear data c1 231 and c2 232 sorted in a descending order by comparing the received nonlinear data y1 211 and y2 212 with each other. The comparison module is the core component of the present invention, and if the comparison module does not exist, the data size increases from 8 bits to 16 bits, and thus reducing the memory size of hardware is meaningless. For example, if 20 is input as y1 and 10 is input as y2, the comparison module sorts the input values in a descending order to obtain c1 of 20 and c2 of 10 and transmits the sorted values to the index module. If y1 is equal to y2, the values are sorted as c1=c2, and a nonlinear output value is derived using one of the values.

The index module 240 derives the index value d1 241 from the sorted nonlinear data c1 231 and c2 232 according to a preset computation. At this point, the index module may calculate the index value using a different preset computation according to whether the nonlinear function F is an exponential function or a logarithmic function. The index module may derive the index value d1 by dividing a smaller value by a larger value through a computation of d1=c2/c1 when the nonlinear function F is an exponential function and derive the index value by subtracting a smaller value from a larger value through a computation of d1=c1-c2 when the nonlinear function F is a logarithmic function. As a result, the index module 240 may reduce the size of the lookup table memory 250 by replacing the values of the sorted nonlinear data c1 231 and c2 232 with one value of d1 241.

At this point, c1 and c2, which are input values of the index module, are 8-bit data, and the index module should reduce an index address to be less than 8 bits by dividing the two values in order to effectively reduce the overall memory size of the hardware device and the chip size.

The lookup table memory 250 calculates the variable B 251 using the index value d1 241, the nonlinear function F and a preset computation formula on the basis of a previously stored lookup table LUT and stores the calculated result. At this point, the lookup table memory previously stores a value calculated by a computer according to the value of the index module 240 and outputs a value of the variable, which is an output corresponding to the index. That is, a result of d1 between 0 to 255 (8 bits) calculated through the preset computation formula is stored in the lookup table memory, and if a value of d1 is inputted, an output value corresponding to the input value comes out in a short time from the lookup table.

At this point, the lookup table memory of the present invention is preferably configured in a size of 256×8 bits=2048 bits to perform the computation in a short time. However, since the error tolerance varies according to hardware, the lookup table memory may be configured in a further reduced size of 128×8 bits or 64×8 bits.

In addition, the lookup table memory may calculate the variable B using a formula of $$B = F\left(\frac{1}{2} + \frac{1}{2}F^{-1}(d_1)\right).$$

For example, when the nonlinear function F is an exponential function $$F(x) = x^{\frac{1}{2.2}},$$

the variable B may be derived using a formula of $$B = F\left(\frac{1}{2} + \frac{1}{2}(d_1)^{2.2}\right)^{\frac{1}{2.2}}.$$

Since F is an exponential function, d1 may be derived through a computation of c2/c1.

Describing the method of deriving a calculation formula for setting the variable B, first, if it is assumed that a formula for calculating an arithmetic mean of x1 and x2 can be expressed as a product of c1 and the variable B, a formula as shown below can be made.

$$F\left[\frac{1}{2}F^{-1}(c_1) + \frac{1}{2}F^{-1}(c_2)\right] = B * c_1$$

If both sides are divided by c1 to put the c1 in the function F, a formula with respect to variable B can be derived as shown below.

$$F\left[\frac{\frac{1}{2}F^{-1}(c_1) + \frac{1}{2}F^{-1}(c_2)}{F^{-1}(c_1)}\right] = B$$

Accordingly, a formula with respect to variable B can be derived as shown below.

$$B = F\left(\frac{1}{2} + \frac{1}{2}F^{-1}\left(\frac{c_2}{c_1}\right)\right)$$

The computation module 260 receives c1, which is the largest value among the sorted nonlinear data, and variable B and derives a final nonlinear output value A through a preset computation. At this point, the computation module may derive the final nonlinear output value A through a computation of A=B*c1 when the nonlinear function F is an exponential function and derive the final nonlinear output value A through a computation of A=B+c1 when the nonlinear function F is a logarithmic function. In addition, the computation module may be configured of an 8×8 multiplier when the nonlinear function F is an exponential function and configured of an 8-bit adder when the nonlinear function F is a logarithmic function.

Figure 5:
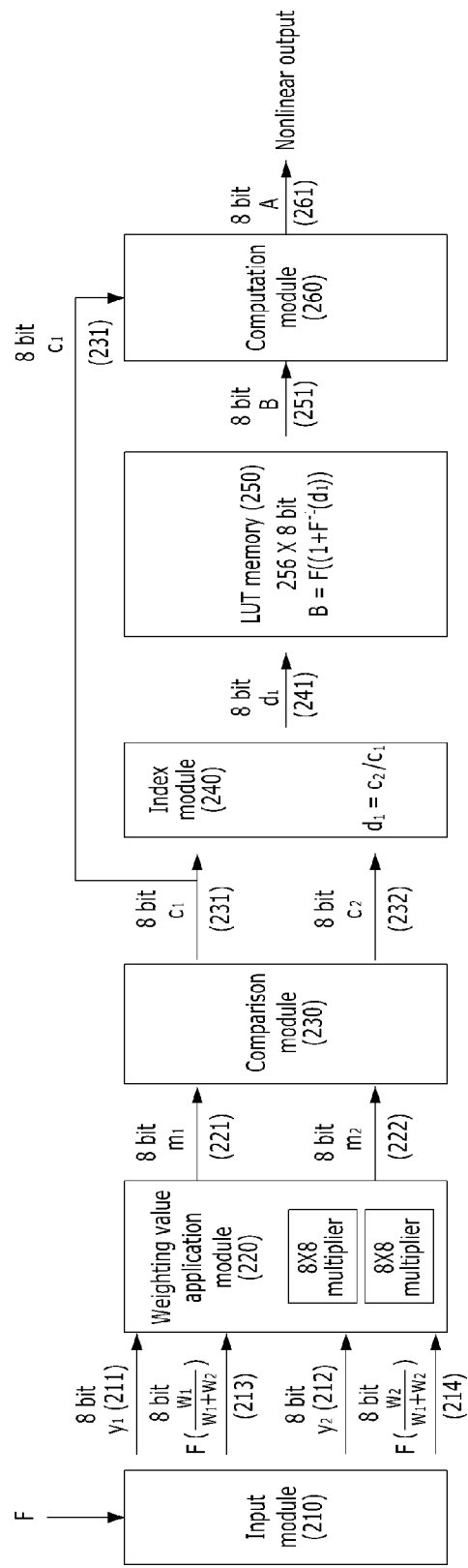
FIG. 5 is an exemplary view showing the configuration of performing a weighted average calculation by an average calculation device for calculating an average of nonlinear data according to an embodiment of the present invention.

FIG. 5 is an exemplary view showing the configuration of performing a weighted average calculation by an average calculation device for calculating an average of nonlinear data according to an embodiment of the present invention.

Referring to FIG. 5, an average calculation device 200 for calculating an average of nonlinear data according to the present invention may include an input module 210, a weighting value application module 220, a comparison module 230, an index module 240, a lookup table memory 250 and a computation module 260. At this point, a weighted average corresponds to an average value obtained by multiplying a weighting value corresponding to importance or effectiveness when an average value of n numerals is calculated.

The input module 210 receives a nonlinear function F, nonlinear data y1 211 and y2 212 and weighting values w1 and w2. Since the weighting values w1 and w2 are constants, they are nonlinear values calculated externally, and the weighting values w1 and w2 are created and used as a nonlinear function as shown below.

$$F\left(\frac{w_1}{w_1 + w_2}\right), F\left(\frac{w_2}{w_1 + w_2}\right)$$

The weighting value application module 220 derives weighting-value-applied nonlinear data m1 221 and m2 222 by applying the weighting values w1 and w2 to the nonlinear data y1 211 and y2 212. At this point, m1 and m2 can be derived using a formula of multiplying the values obtained by applying the weighting values w1 and w2 to a nonlinear function by y1 and y2. In addition, the weighting value application module may be configured to include a first multiplier and a second multiplier of an 8*8-bit size to perform computations of F*y1 and F*y2.

$$m_1 = F\left(\frac{w_1}{w_1 + w_2}\right) * y_1$$

$$m_2 = F\left(\frac{w_2}{w_1 + w_2}\right) * y_2$$

For example, when w1=0.25 and w2=0.75 and the linear function is $F(x)=x^{2.2}$, $F(w1/(w1+w2))=(0.25)^{2.2}=0.0474$ and $F(w2/(w1+w2))=(0.75)^{2.2}=0.531$ is calculated. Subsequently, if 0.0474*255=12 and 0.531*255=135, which are 8-bit values corresponding thereto, are input from the input module into the weighting value application module, they are multiplied by y1 and y2, respectively.

The comparison module 230 derives nonlinear data c1 231 and c2 232 sorted in a descending order by comparing the received weighting-value-applied nonlinear data m1 221 and m2 222 with each other, and the processes performed by the index module 240, the lookup table memory 250 and the computation module 260 following the comparison module using c1 and c2 are progressed in an order the same as that of the arithmetic means calculation of FIG. 4.

However, in the case of the lookup table memory 250, the variable B may be calculated using a formula of $B=F(1+F^{-1}(d_1))$ when a weighted average is calculated.

Figure 6:
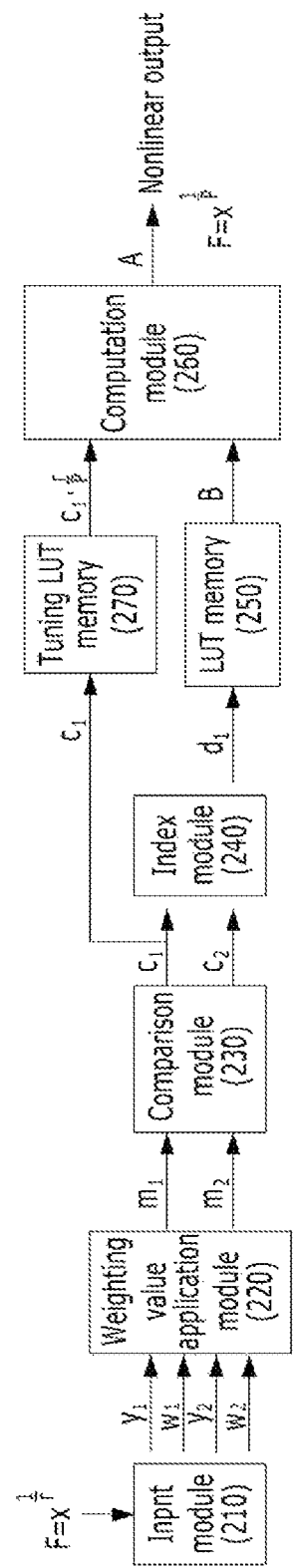
FIG. 6 is a view showing the configuration of an average calculation device for calculating an average of nonlinear data according to an embodiment of the present invention, further comprising a tuning lookup table memory for matching input/output function parameters.

FIG. 6 is a view showing the configuration of an average calculation device for calculating an average of nonlinear data according to an embodiment of the present invention, further comprising a tuning lookup table memory for matching input/output function parameters.

Referring to FIG. 6, an average calculation device for calculating an average of nonlinear data according to the present invention includes an input module 210, a weighting value application module 220, a comparison module 230, an index module 240, a lookup table memory 250 and a computation module 260 and may further include a tuning lookup table memory 270.

The tuning lookup table memory 270 is connected between the comparison module and the computation module to match an input function parameter and an output function parameter by correcting c1, which is the largest value among the sorted nonlinear data, through a preset computation.

For example, when an exponential value r of an input inverse function $x=y^r$ is different from an exponential value p of an output nonlinear function $F=x^{(1/p)}$ in the process of linear-to-nonlinear signal conversion, calculation of an average of the exponential function may obtain a correct output value only when the value of c1, which is multiplied to the variable B, is multiplied after being corrected to a value of $c1^{r/p}$. Accordingly, a final nonlinear output is outputted as a value of $A=B*c1^{r/p}$) through the computation module 260 after the value of c1 is tuned to a value of $c1^{r/p}$ through the tuning lookup table memory.

Figure 7A:
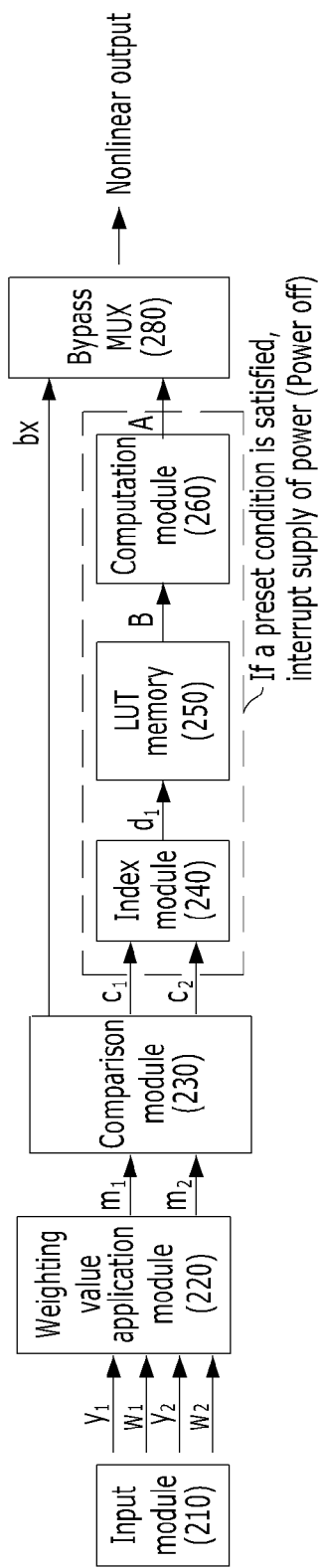
FIGS. 7a and 7b are views showing the configuration of an average calculation device for calculating an average of nonlinear data according to an embodiment of the present invention, further comprising a bypass MUX for interrupting supply of power when a predetermined condition is satisfied.
Figure 7B:
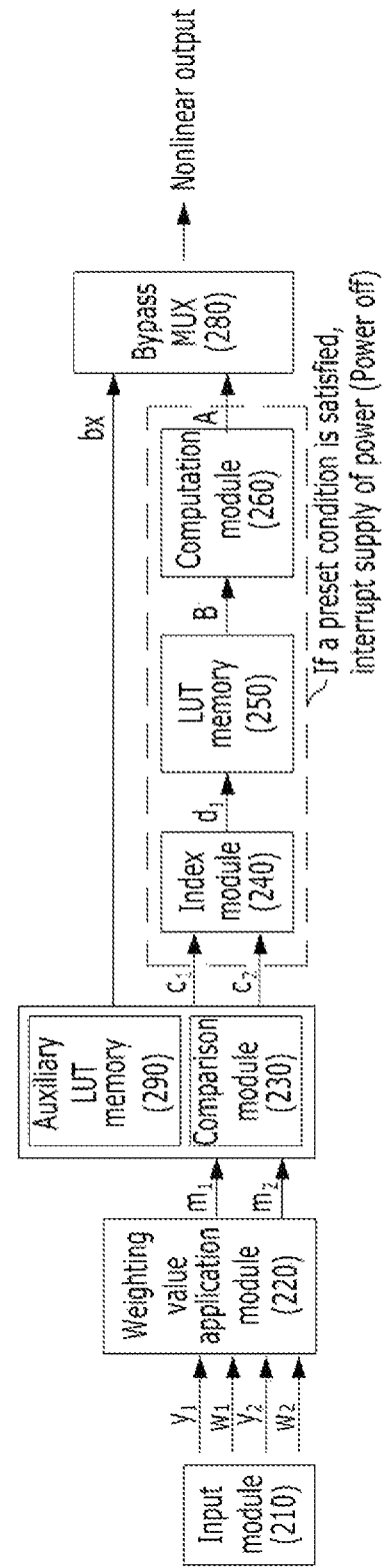

FIGS. 7a and 7b are views showing the configuration of an average calculation device for calculating an average of nonlinear data according to an embodiment of the present invention, further comprising a bypass MUX for interrupting supply of power when a predetermined condition is satisfied.

Referring to FIG. 7a, an average calculation device for calculating an average of nonlinear data according to the present invention includes an input module 210, a weighting value application module 220, a comparison module 230, an index module 240, a lookup table memory 250 and a computation module 260 and may further include a bypass MUX 280.

If a preset condition is satisfied, the bypass MUX 280 outputs a bx (bypass mux) value calculated by the comparison module as a final nonlinear output value. At this point, when the preset condition is satisfied, power consumption of corresponding logic can be reduced by interrupting supply of power to the index module 240, the lookup table memory 250 and the computation module 260.

At this point, the bx value input into the bypass MUX varies according to a specific condition for interrupting supply of power, and an example of the preset condition may be expressed as shown below.

if (m1=m2) then bypass on and output m1 as bx value;
else if {m1<low threshold(0×10) and m2>high threshold (0×F0)} then bypass on and output m1 as bx value;
else if {m1>high threshold(0×1F) and m2<low threshold (0×10)} then bypass on and output m1 as bx value;
else bypass off;

In addition, as shown in FIG. 7b, the average calculation device for calculating an average of nonlinear data according to the present invention may further include an auxiliary lookup table memory 290.

The auxiliary lookup table memory 290 is included in the comparison module, stores an auxiliary lookup table in advance for the final nonlinear output value bx using a preset computation formula, and transmits a bx corresponding to the auxiliary lookup table to the bypass MUX if the sorted data c1 and c2 exist within a preset range.

The preset condition according to c1 and c2 is as shown below.

$$C_{linear} = \begin{cases} \frac{C_{srgb}}{12.92}, & C_{srgb} \leq 0.04045 \\ \left(\frac{C_{srgb} + a}{1 + a}\right)^{2.4}, & C_{srgb} > 0.04045 \end{cases} \quad \text{(Formula 3)}$$

Referring to formula 3, the sRGB function is configured in a form combining a linear function and a nonlinear function. It is configured as a linear function if C is smaller than 0.04045 and as a nonlinear function if C is between 0.04045 and 1. At this point, an 8-bit value of 0.04045 corresponds to 10. (0.04045*255=10.31475)

i) First, if both c1 and c2 are linear, the two inputs are in a linear range of 0 to 10. ii) In addition, if both c1 and c2 are nonlinear, the two inputs are in a nonlinear range of 11 to 255. iii) In addition, if c1 is nonlinear and c2 is linear, the larger value c1 is in the nonlinear range of 11 to 255, and the smaller value c2 is in the linear range of 0 to 10.

In this case, i) if both the input values are linear, a linear average is calculated and outputted, ii) if both the input values are nonlinear, a nonlinear average is calculated and outputted, and iii) if only one of the input values is nonlinear, a value calculated in advance using the auxiliary lookup table memory is outputted.

Figure 8:
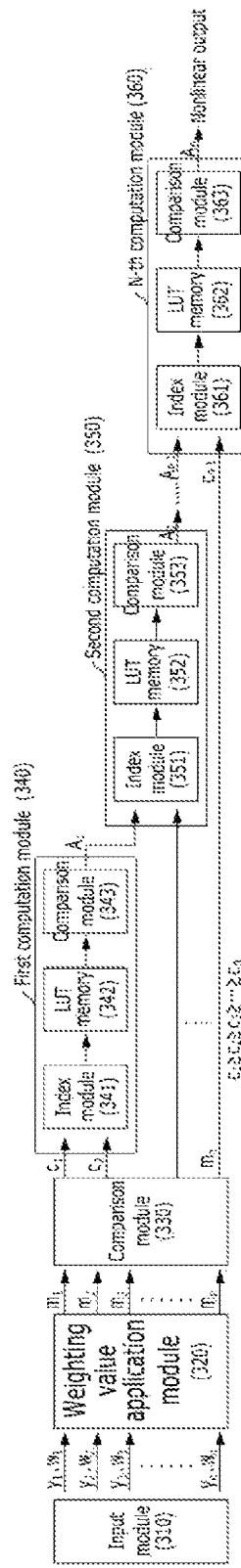
FIG. 8 is a view showing the configuration of an average calculation devices for calculating an average of a plurality of nonlinear data according to an embodiment of the present invention, in which computation modules are connected in series to perform an average calculation.

In addition, to reduce the size of the auxiliary lookup table memory as much as possible, the auxiliary lookup table memory is used only when the value of c1 is between 0 and 63 (6 bits), and when the value of c1 is between 64 and 255, a nonlinear calculation process is performed since the error is not so large although the nonlinear calculation is performed. Accordingly, the auxiliary lookup table memory outputs a value (8 bits) calculated in advance using a computer according to a 10-bit index for receiving c1 of 6 bits and c2 of 4 bits.

if (c1<=10 and c2<=10) then bypass on and output linear average (c1, c2) as bx value;
   else if {c1<=63 and c2<=10} then bypass on and output
     Sub LUT value as bx value;
   else bypass off;

FIG. 8 is a view showing the configuration of an average calculation devices for calculating an average of a plurality of nonlinear data according to an embodiment of the present invention, in which computation modules are connected in series to perform an average calculation.

Referring to FIG. 8, an average calculation device for calculating an average of a plurality of nonlinear data according to the present invention may include an input module 310, a weighting value application module 320, a comparison module 330 and first to n-th computation modules 340 to 360.

The input module 310 receives a nonlinear function F, nonlinear data y1, y2 . . . yn, and weighting values w1, w2 . . . wn, and the weighting value application module 320 derives weighting-value-applied nonlinear data m1, m2 . . . mn by applying the weighting values w1, w2 . . . wn to the nonlinear data y1, y2 . . . yn. Subsequently, the comparison module 330 derives nonlinear data c1, c2 . . . cn sorted in a descending order by comparing the weighting-value-applied nonlinear data m1, m2 . . . mn with each other. At this point, since only the number of data is increased to a plurality of data and the works performed by the input module, the weighting value application module and the comparison module are the same as those of the method of calculating an arithmetic mean and an a weighted average of nonlinear data shown in FIGS. 4 and 5, the previous descriptions are referred to.

For example, when weighting values w1, w2 and w3 are created as a nonlinear function and multiplied by y1, y2 and y3, it can be calculated as shown below.

$$m_1 = F\left(\frac{w_1}{w_1+w_2+w_3}\right) * y_1$$

$$m_2 = F\left(\frac{w_2}{w_1+w_2+w_3}\right) * y_2$$

$$m_3 = F\left(\frac{w_3}{w_1+w_2+w_3}\right) * y_3$$

The first computation module 340 and the second to n-th computation modules 340 to 360 derive a nonlinear output value An from the sorted nonlinear data c1, c2 . . . cn according to a preset computation. (At this point, n is an integer equal to or larger than 2.)

In addition, the first computation module and the second to n-th computation modules may be cascaded to derive the final nonlinear output value An. At this point, when the k-th computation module (1<k<n) derives a nonlinear output value Ak, the k-th computation module receives a nonlinear output value Ak−1 derived by the k−1-th computation module and derives the nonlinear output value Ak from a nonlinear data ck+1 and the nonlinear output value Ak−1 according to a preset computation. For example, the fifth computation module receives a nonlinear output value A4 derived by the fourth computation module and derives a nonlinear output value A5 from the nonlinear data c6 and A4 according to a preset computation.

In addition, the first computation module and the second to n-th computation modules may include an index module 341, 351 and 361, a lookup table memory 342, 352 and 362 and a computation module 343, 353 and 363, respectively. The index module derives an index value from inputted nonlinear data through a preset computation according to a function, and the lookup table memory calculates a variable from the index value using a nonlinear function and a preset computation formula on the basis of a previously stored lookup table LUT and stores a calculated result. The computation module receives the largest value among the inputted nonlinear data and the variable and derives a final nonlinear output value through a preset computation. At this point, as described above, a preset computation performed by each of the modules shown in FIG. 8 is the same as a computation performed by each of corresponding modules shown in FIGS. 4 and 5.

For example, a formula for calculating an average of three inputs may be as shown below.

$$F[F^{-1}(c_1)+F^{-1}(c_2)+F^{-1}(c_3)]=B_1*B_2*c_1 \quad \text{(Formula 4)}$$

To obtain the above formula, first, if it is assumed that a sum of two linear functions $F^{-1}$ (c1) and $F^{-2}$ (c2), which are two inputs, is $F^{-1}$ (b1)*$F^{-1}$ (c1), this can be expressed as shown below.

$$F^{-1}(c_1) + F^{-1}(c_2) = F^{-1}(B_1) * F^{-1}(c_1) \quad \text{(Formula 5)}$$

$$1 + \frac{F^{-1}(c_2)}{F^{-1}(c_1)} = F^{-1}(B_1)$$

$$B_1 = F\left[1 + F^{-1}\left(\frac{c_2}{c_1}\right)\right]$$

Formula 5 is put into formula 4 again.

$$F[F^{-1}(B_1)*F^{-1}(c_1)+F^{-1}(c_3)]=B_1*B_2*c_1$$

Both sides are divided by B1*c1.

$$\frac{F[F^{-1}(B_1)*F^{-1}(c_1)+F^{-1}(c_3)]}{F^{-1}(B_1)*F^{-1}(c_1)} = B_2$$

$$B_2 = F\left(1 + F^{-1}\left(\frac{c_3}{c_1*B_1}\right)\right)$$

Subsequently, if several nonlinear data and weighting values are further added, as many computation modules are further cascaded in series, and an average of n data can be calculated.

Figure 9:
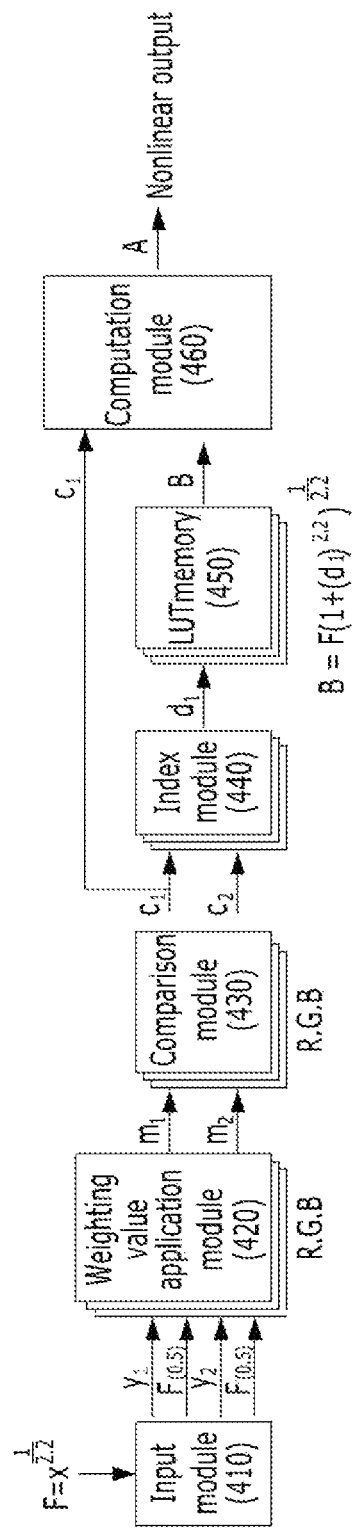
FIGS. 9, 10a and 10b are views showing the configurations of an average calculation device for calculating an average of nonlinear data according to an embodiment of the present invention, which is applied to an RGBG PenTile driving device.
Figure 10A:
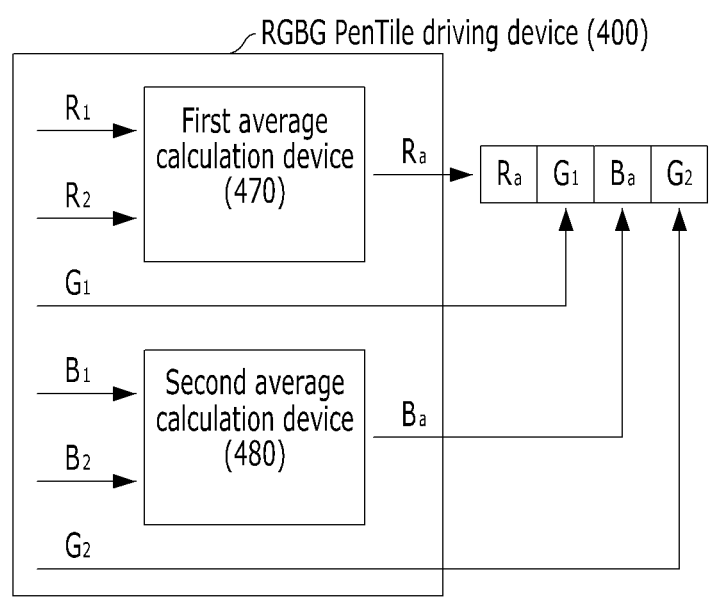
Figure 10B:
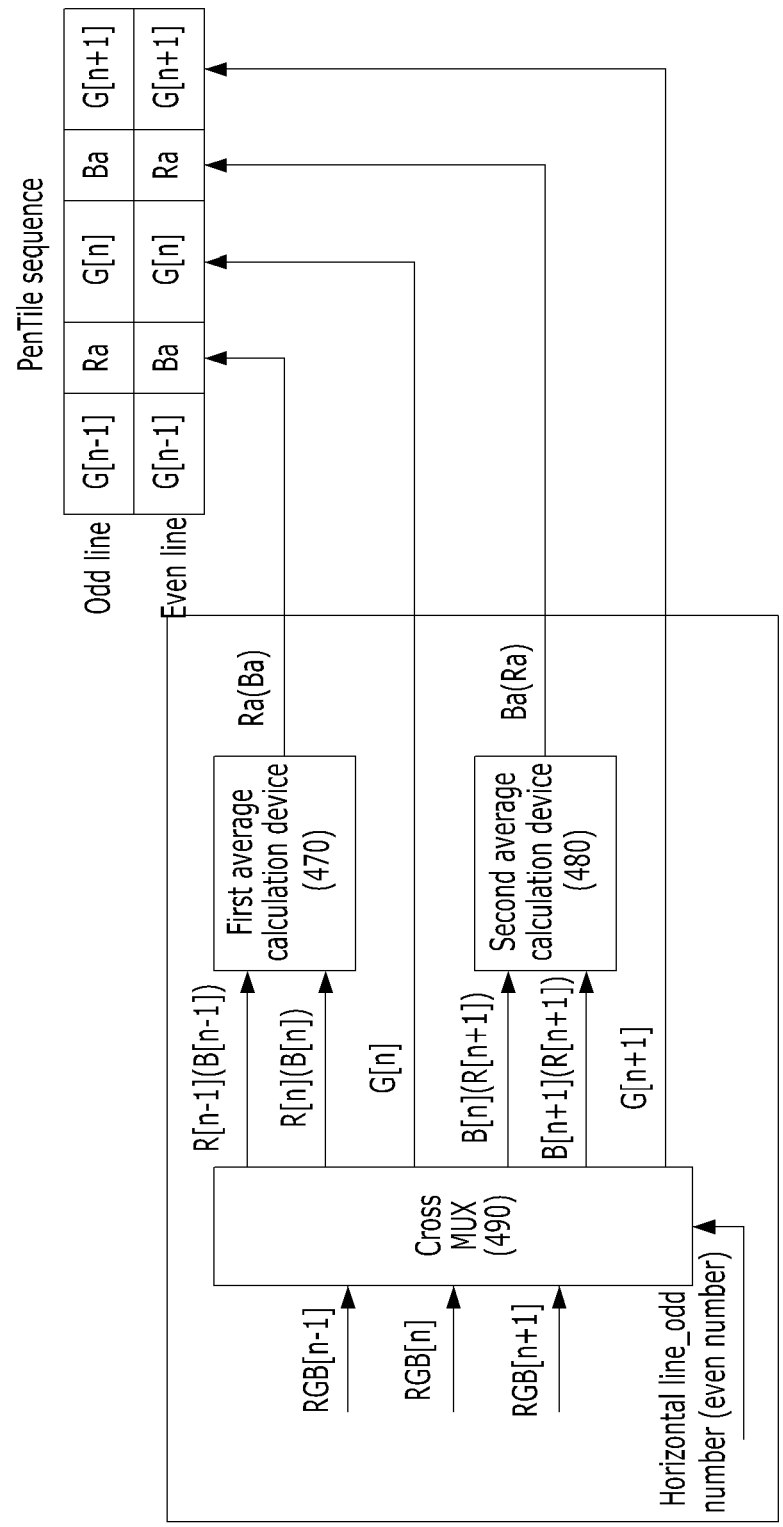
Figure 11:
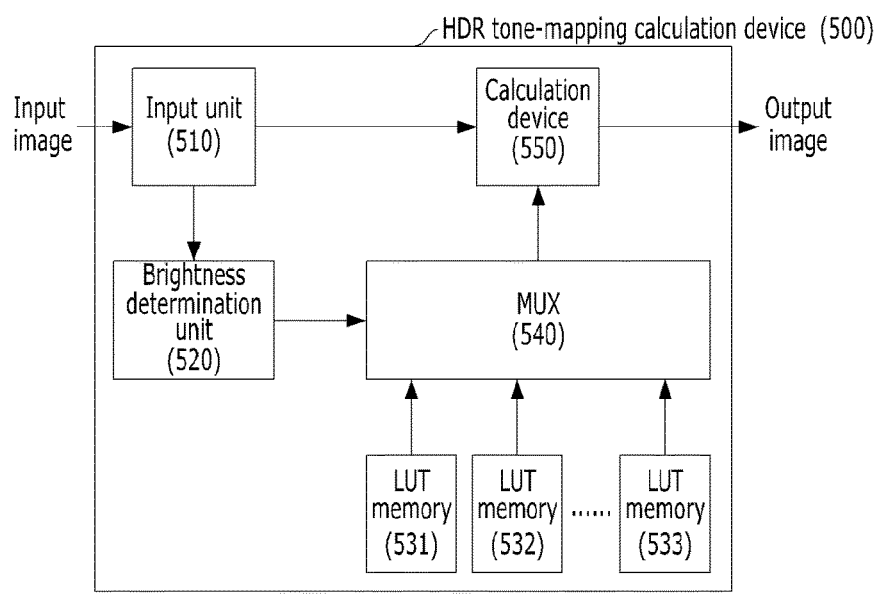
FIG. 11 is a view showing the configuration an average calculation device for calculating an average of nonlinear data according to an embodiment of the present invention, which is applied to an HDR tone-mapping calculation device.

FIGS. 9 and 10 are views showing the configurations of an average calculation device for calculating an average of nonlinear data according to an embodiment of the present invention, which is applied to an RGBG PenTile driving device, and FIG. 11 is a view showing the configuration an average calculation device for calculating an average of nonlinear data according to an embodiment of the present invention, which is applied to an HDR tone-mapping calculation device.

Referring to FIGS. 9, 10a and 10b, an average calculation device for calculating an average of nonlinear data according to the present invention may be applied to an RGBG PenTile deriving device used when a display system renders RGB pixels.

In the case of a conventional method of performing pixel rendering, first, if a linear signal is input through a sensor of a camera or the like, the input module uses a gamma encoding technique to allocate more data to a dark portion that is sensitive to the human eyes. Most of generally used images of stored pictures, Internet drawings, photoshop and the like are gamma encoded data, and these nonlinear inputs are linearized by performing an input gamma process of an inverse gamma characteristic, and a gamma characteristic appropriate to the human eyes is applied again (an image mixing or pixel rendering work). Then, since the human eyes have a nonlinear characteristic, they feel a signal of 2.2 gamma characteristic as linear.

At this point, a conventional device needs six input tables and three output tables to perform an RGB pixel rendering work, and 3*38,912=116,736 bits are needed as the total memory size of all the tables.

However, in the case of a pixel rendering device of the present invention, the values stored in the lookup table memory are accurately calculated using a computer, and since only three lookup table memories are needed per RGB pixel, 3*256*8 bit=12,288 bits are needed as the memory size of all the tables. Particularly, in the case of a system which permits low precision, the size of the lookup table memory may be reduced as much as 128*8 or 64*8 bits.

A PenTile display is a display which arranges existing two RGB1 and RGB2 subpixels as RG and BG by reducing the number of subpixels of R and G in half, and this is a panel that can display an image with a smaller number of subpixels. To display an existing RGB input on this panel, although G is displayed as is, R and B are displayed on the panel by calculating an average of the two inputs. Such an RGBG PenTile driving device may have an effect of saving memory by using a plurality of average calculation devices.

The PenTile driving device of the present invention may include a first average calculation device 470, a second average calculation device 480 and a display as shown in FIG. 10a.

The first average calculation device 470 receives nonlinear data R1 and R2, derives an index value through a preset computation after sorting the nonlinear data, calculates a variable according to a preset computation formula and a lookup table, and derives a final nonlinear output value Ra through a preset computation.

The second average calculation device 480 receives nonlinear data B1 and B2, derives an index value through a preset computation after sorting the nonlinear data, calculates a variable according to a preset computation formula and a lookup table, and derives a final nonlinear output value Ba through a preset computation.

The display receives nonlinear data G1 and G2 and displays the Ra, the G1, the Ba and the G2.

Referring to FIG. 10b, the RGBG PenTile driving device of the present invention may further include a cross MUX.

The PenTile display is a display which arranges existing two RGB1 and RGB2 subpixels as RG and BG by reducing the number of subpixels of R and G in half and may display an image with a smaller number of subpixels. To display an existing RGB input on this panel, although G is displayed as it is inputted, R and B are displayed on the panel by calculating an average of the two inputs. If the present invention is applied to the PenTile driving device, the effect of saving memory of the present invention can be expected since a plurality (two) of average calculation devices is needed.

The cross MUX sequentially receives a plurality of RGBs and inputs nonlinear data into the first average calculation device and the second average calculation device.

At this point, when RGBs are sequentially input in order of (n−1), (n) and (n+1), the cross MUX selects R and B data to be inputted in the average calculation devices, which are in an order the same as that of the G data positioned on both sides of R and B in the PenTile sequence. Subsequently, R and B are alternately selected according to odd and even rows, such as RGBG in an odd row and BGRG in an even row.

Since the cross MUX of the present invention selects R and B of an order the same as that of G data on both sides and selects data prior to the average calculation device, only a MUX of 8-bit unit is used, and thus the size of the MUX working at 12 bits, which is a linear section in an existing PenTile driving device, can be reduced, and the number of logic elements can be reduced.

The first average calculation device receives Rn−1, Rn, Bn−1 and Bn, derives an index value through a preset computation after sorting the nonlinear data, calculates a variable according to a preset computation formula and a lookup table, and derives final nonlinear output values Ra and Ba through a preset computation.

The second average calculation device receives Bn, Bn+1, Rn and Rn+1, derives an index value through a preset computation after sorting the nonlinear data, calculates a variable according to a preset computation formula and a lookup table, and derives final nonlinear output values Ra and Ba through a preset computation.

Figure 12:
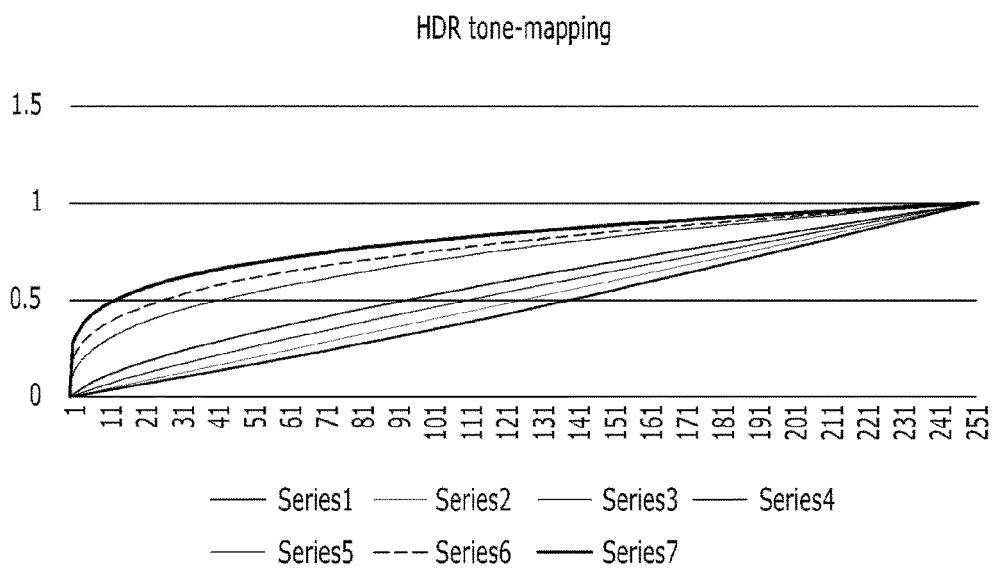
FIG. 12 is a graph showing a tone-mapping work performed by an HDR tone-mapping calculation device according to an embodiment of the present invention.

FIG. 11 is a view showing the configuration an average calculation device for calculating an average of nonlinear data according to an embodiment of the present invention, which is applied to an HDR tone-mapping calculation device, and FIG. 12 is a graph showing a tone-mapping work performed by an HDR tone-mapping calculation device according to an embodiment of the present invention.

A High Dynamic Range (HRD) tone-mapping device is a device for dynamically adjusting an output value by applying several parameters of an exponential function form according to an input image. To implement the device, a plurality of nonlinear calculation tables should be processed (FIG. 12) and the tables should be provided in the form of memory, and if the average calculation for calculating nonlinear data according to the present invention is applied, an HDR tone-mapping work is performed using small memory, and thus the device can be implemented flexibly, and the size of needed memory can be reduced.

The HRD tone-mapping device 500 of the present invention may include an input unit 510, a brightness determination unit 520, lookup table memories 531, 532 and 533, a MUX 540 and a calculation device 550.

The input unit 510 receives an image, and the brightness determination unit 520 may determine brightness (illuminance) of the input image.

The plurality of lookup table memories 531, 532 and 533 calculates a variable using an index value, a nonlinear function and a preset computation formula on the basis of a previously stored lookup table (LUT) and stores the calculated result.

The MUX 540 receives the brightness of the inputted image from the brightness determination unit 520 and selects and outputs a calculation result corresponding to the brightness of the image from the plurality of lookup table memories.

Observing the difference between the present invention and the conventional invention from the aspect of calculation algorithm and hardware configuration, it is as shown below.

First, in the case of the calculation algorithm, since a calculation formula of an existing method calculates an average in a linearized linear domain, it requests hardware to linearize nonlinear signals and requests again to non-linearize calculation results.

However, the calculation algorithm of the present invention uses a nonlinear input as is, applies a weighting value to an input and compares the values, and stores variable B in a small table by calculating a linearization function $F^{-1}(y)$ and a non-linearization function $F(x)$ at a time using a proportion or difference between the two values. Subsequently, the present invention uses an algorithm for performing a computation of addition, subtraction, multiplication or division on the variable B and a value of the input module/weighting value application module/comparison module according to a preset function to accomplish all the hardware calculations in a nonlinear domain without a conversion table.

In addition, in the case of the hardware configuration, an existing method is configured to use a plurality of lookup tables as a linearization lookup table and a non-linearization lookup table and provides a device for performing hardware calculation in a linear domain between the linearization lookup table and the non-linearization lookup table.

However, since the average calculation device of the present invention is configured of a weighting value application module for providing an input terminal with a weighting value, a comparison module for comparing sizes, an index module for calculating a formula related to a difference or proportion of input values, a lookup table memory for storing a variable value calculated in advance according to an index, and a computation module for performing a computation of addition, subtraction, multiplication or division on the variable and c1 according to a function, the lookup table memory is minimized, and the chip size can be easily reduced.

The embodiments of the present invention described above are disclosed for illustrative purposes, and the present invention is not to be restricted by the embodiments. In addition, those skilled in the art may make various changes or modifications within the spirit and scope of the present invention, and such changes or modifications should be consider to fall within the scope of the invention.

The invention claimed is:

1. An average calculation device for calculating an average of non-linear data, the device comprising:
an input module for receiving a nonlinear function F and nonlinear data y1 and y2;
a comparison module for deriving nonlinear data c1 and c2 sorted in a descending order by comparing the received nonlinear data y1 and y2;
an index module for deriving an index value d1 from the sorted nonlinear data c1 and c2 according to a preset computation;
a lookup table memory for storing a lookup table (LUT) of the index value d1 and a variable B in advance using a preset computation formula, and deriving a variable B corresponding to an index value if the index value d1 is received; and
a computation module for receiving c1 among the sorted nonlinear data and the variable B and deriving a final nonlinear output value A through a preset computation.

2. The device according to claim 1, wherein the nonlinear function F is an exponential function or a logarithmic function.

3. The device according to claim 2, wherein the index module derives the index value d1 through a computation of d1=c2/c1 when the nonlinear function F is an exponential function and derives the index value dl through a computation of d1=c1−c2 when the nonlinear function F is a logarithmic function.

4. The device according to claim 2, wherein the index module derives the final nonlinear output value A through a computation of A=B*c1 when the nonlinear function F is an exponential function and derives the final nonlinear output value A through a computation of A=B+c1 when the nonlinear function F is a logarithmic function.

5. The device according to claim 1, wherein the lookup table memory stores a lookup table of the index value d1 and the variable B in advance using a preset computation formula of $$B = F\left(\frac{1}{2} + \frac{1}{2}F^{-1}(d_1)\right).$$

6. The device according to claim 1, further comprises a weighting value application module for deriving weighting-value-applied nonlinear data m1 and m2 by applying weighting values w1 and w2 to the nonlinear data y1 and y2, respectively, wherein the input module further receives the weighting values w1 and w2.

7. The device according to claim 6, wherein the comparison module derives the nonlinear data c1 and c2 sorted in a descending order by comparing the weighting-value-applied nonlinear data m1 and m2 with each other.

8. The device according to claim 6, wherein the weighting-value-applied nonlinear data m1 and m2 are derived using a formula of $$m_1 = F\left(\frac{w_1}{w_1 + w_2}\right) * y_1 \text{ and } m_2 = F\left(\frac{w_2}{w_1 + w_2}\right) * y_2.$$

9. The device according to claim 6, wherein the weighting value application module includes a first multiplier and a second multiplier.

10. The device according to claim 1, further comprising a tuning lookup table memory connected between the comparison module and the computation module to match an input function parameter and an output function parameter by correcting c1, which is the largest value among the sorted nonlinear data, through a preset computation.

11. The device according to claim 1, further comprising a bypass MUX for outputting a bx value calculated by the comparison module as a final nonlinear output value if a preset condition is satisfied.

12. The device according to claim 11, wherein when the preset condition is satisfied, supply of power to the index module, the lookup table memory and the computation module is interrupted.

13. The device according to claim 11, further comprising an auxiliary lookup table memory for storing an auxiliary lookup table in advance for the final nonlinear output value bx using a preset computation formula, and transmitting a bx corresponding to the auxiliary lookup table to the bypass MUX if the sorted data c1 and c2 exist within a preset range.

14. An average calculation devices for calculating an average of a plurality of non-linear data, the device comprising:
   an input module for receiving a nonlinear function F and nonlinear data y1, y2 . . . yn;
   a comparison module for deriving nonlinear data c1, c2 cn sorted in a descending order by comparing the nonlinear data y1, y2 . . . yn with each other; and
   first to n-th computation modules for deriving a nonlinear output value An from the sorted nonlinear data c1, c2 . . . cn according to a preset computation (n is an integer equal to or larger than 2), wherein
   the first to n-th computation modules are cascaded to derive the final nonlinear output value An.

15. The device according to claim 14, wherein when a k-th computation module (1<k<n) among the first to n-th computation modules derives a nonlinear output value Ak, the k-th computation module receives a nonlinear output value Ak−1 derived by a k−1-th computation module and derives the nonlinear output value Ak from a nonlinear data ck+1 and the nonlinear output value Ak−1 according to a preset computation.

16. The device according to claim 14, wherein each of the first to n-th computation modules includes:
   an index module for deriving an index value from an inputted nonlinear data through a preset computation according to a function;
   a lookup table memory for storing a lookup table (LUT) of the index value and a variable in advance using a preset computation formula, and deriving a variable corresponding to an index value if the index value is received; and
   a computation module for receiving a largest value among the sorted nonlinear data and the variable and deriving a final nonlinear output value through a preset computation.

17. The device according to claim 14, further comprising a weighting value application module for deriving weighting-value-applied nonlinear data m1, m2 . . . mn by applying weighting values w1, w2 . . . wn to the nonlinear data y1, y2 . . . yn, respectively, wherein the input module further receives the weighting values w1, w2 . . . wn.

18. The device according to claim 17, wherein the comparison module derives the nonlinear data c1, c2 . . . cn sorted in a descending order by comparing the weighting-value-applied nonlinear data m1, m2 . . . mn with each other.

19. An RGBG PenTile driving device comprising:
   a first average calculation device for receiving nonlinear data R1 and R2, deriving an index value through a preset computation after sorting the nonlinear data, calculating a variable according to a preset computation formula and a lookup table, and deriving a final nonlinear output value Ra through a preset computation;
   a second average calculation device for receiving nonlinear data B1 and B2, deriving an index value through a preset computation after sorting the nonlinear data, calculating a variable according to a preset computation formula and a lookup table, and deriving a final nonlinear output value Ba through a preset computation; and
   a display for receiving nonlinear data G1 and G2 and displaying the Ra, the G1, the Ba and the G2.

20. An HDR tone-mapping calculation device comprising:
   an input unit for receiving an image;
   a brightness determination unit for determining brightness of the input image;
   a plurality of lookup table memories for storing a lookup table (LUT) of an index value and a variable in advance using a preset computation formula, and deriving a variable corresponding to an index value if the index value is received; and
   a MUX for receiving the brightness of the inputted image from the brightness determination unit and selecting and outputting a calculation result corresponding to the brightness of the image from the plurality of lookup table memories.

* * * * *